April 4, 1950  W. E. PHILLIPS  2,503,169
HOSE COUPLING
Filed Dec. 13, 1946  2 Sheets-Sheet 1
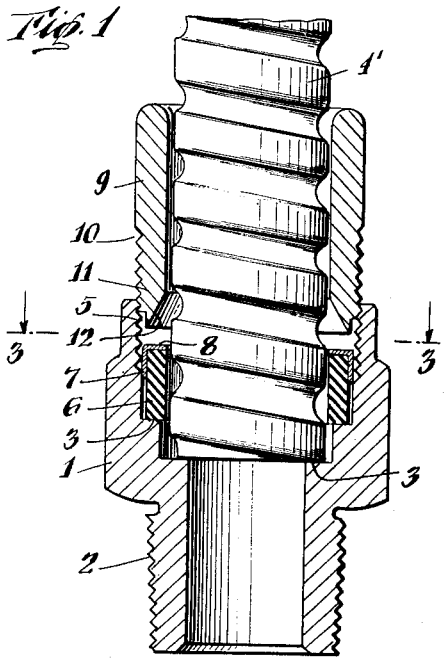
Fig. 1
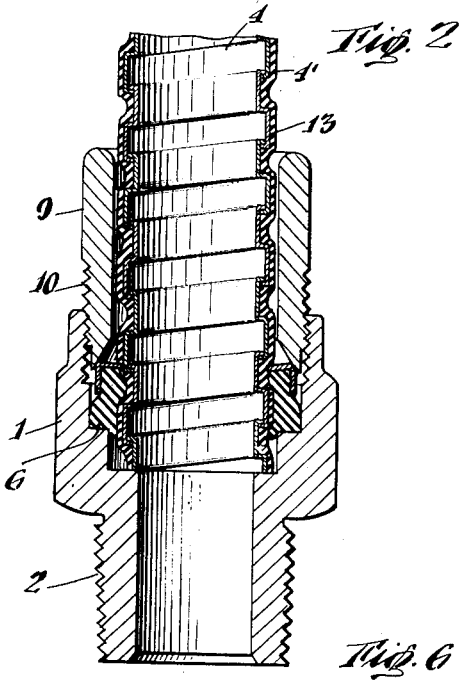
Fig. 2
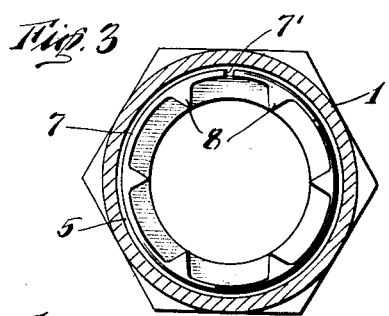
Fig. 3
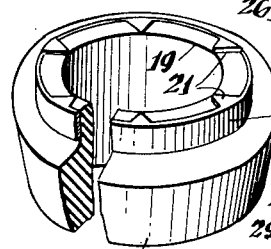
Fig. 5
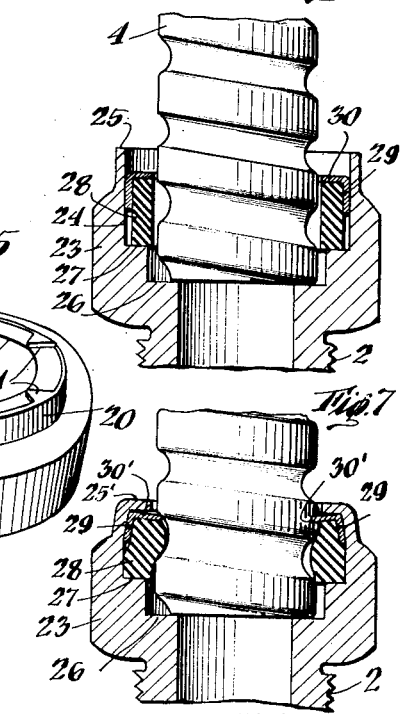
Fig. 6
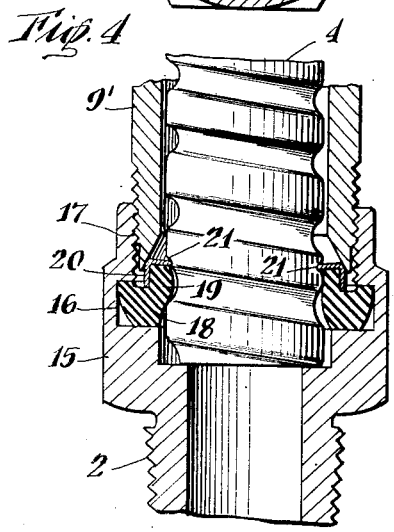
Fig. 4
Fig. 7
INVENTOR
Walter E. Phillips
BY Robert S. Dunham
ATTORNEY April 4, 1950   W. E. PHILLIPS   2,503,169
HOSE COUPLING Filed Dec. 13, 1946   2 Sheets-Sheet 2

INVENTOR
Walter E. Phillips
BY
Robert S. Dunham
ATTORNEY

Patented Apr. 4, 1950

2,503,169

UNITED STATES PATENT OFFICE 2,503,169

HOSE COUPLING

Walter E. Phillips, Lynbrook, N. Y.

Application December 13, 1946, Serial No. 715,913

9 Claims. (Cl. 285—86)

This invention relates to a hose coupling for hose that is suitable for electric wiring, for example. Although this coupling is particularly suitable for a flexible metal hose it is not limited to this use. This coupling is useful, for example, for attaching a hose to a nipple.

It is desirable in electric wiring of machine tools, automobiles and aircraft to fully protect the electric wires from moisture thereby preventing short circuits and also lengthening the life of the insulating material on the wires and insuring longer periods of uninterrupted service. Heretofore, a flexible water and air-tight hose, such as a metal-lined rubber or synthetic covered hose has been used for this purpose. The hose was made by extruding a rubber or synthetic jacket on the outside of flexible metal conduit. There is no coupling problem because the outside is flat. A simple ring can be squeezed against the outside diameter to make an effective seal. This sort of tubing and coupling is very expensive and quite heavy in weight.

With the present invention the same result can be accomplished as effectively but at a much lower cost. The present device is also much lighter in weight and is much more easily assembled in the field since no tools of any kind are required to effect the seal.

With this invention the hose is kept liquid-tight and the hose provides electric conductivity throughout the length of the hose from coupling to coupling. This conductivity is provided by an integral ring that is recessed so as to allow the rubber or synthetic material to flow freely while contact is being made between the end of the metal hose lining and an integral ring. In order to insure more positive conductivity, metal to metal contact is provided by a metal ring having a number of points, which, when squeezed between the two members of the coupling penetrate the outer rubber or synthetic jacket and contact the inner metal liner. A water- and air-tight seal is formed by the rubber or synthetic ring which flows into and hugs the helically grooved outside wall of the flexible tubing, and longitudinal stress is resisted by prongs on the metal ring. These prongs serve a dual purpose of both holding the coupling rigidly to the hose and also making metal-to-metal contact to provide good conductivity. The present coupling is suitable to be used on a hose having an irregular surface or helically grooved outer surface which is usually very difficult to seal against.

With this invention, electrical conductivity, air and moisture resistance, and resistance against longitudinal stress is well provided for, while at the same time hose with irregular surfaces can be effectively sealed simply and economically without adding appreciably to its weight.

With this invention the end of a flexible metal hose can be quickly secured and easily attached to a nipple without special tools and without danger of leakage.

In carrying out the invention a nut is provided with a threaded extension so that it can be screwed into a threaded hole in a container, for example, and a metal hose attached thereto very easily with a wrench or the like.

The invention may be understood from the description in connection with the accompanying drawing in which—

Fig. 1 is a longitudinal section illustrating an embodiment of the invention;

Fig. 2 is a similar section with certain parts in other positions;

Fig. 3 is a section along the line 3—3 of Fig. 1;

Fig. 4 is a longitudinal section showing a modification;

Fig. 5 is a perspective view of some of the elements of Fig. 4;

Fig. 6 is a longitudinal section through another modification;

Fig. 7 is a section similar to Fig. 6 with portions in other positions;

Figure 10:
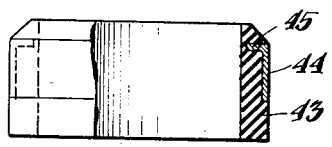
Fig. 10 is a side view, partly in section, showing a modification of one of the parts.

In the drawings, reference character 1 indicates a nut that is provided with a threaded extension 2. A circular seat 3 is provided in this nut for the end of a flexible metallic hose 4 that is rubber-covered as shown at 4'. The nut 1 is provided with another circular seat 3' which is of larger diameter than the seat 3. The nut 1 is provided with an internally threaded portion 5 at its upper end. A cylindrically-shaped gasket 6 of rubber or rubber-like material is located on the circular seat 3'. A metal ring 7 surrounds the upper portion of the gasket 6. It is slitted as indicated at 7' so that its diameter can be varied. Spaced integral V-shaped prongs 8 extend radially inwardly at the upper end of the ring 7.

A tubular metallic holder 9 having an external thread 10 along its lower portion is adapted to be screwed into the threaded portion 5 of nut 1. The lower end 11 of the holder 9 is bevelled as indicated at 12 so as to provide a conically-shaped surface at the lower inside portion of the holder 9 with a thin edge at its end. Insulation 13 is applied to the hose 4, as indicated in Fig. 2.

In the modification shown in Figs. 4 and 5, the nut 15 is somewhat similar to the nut 1. It has an under-cut portion 16 at the lower end of its internally threaded portion 17. A somewhat conically-shaped split rubber ring 18 is located in the under-cut portion 16. A cylindrical portion 19 of smaller diameter than the lower portion of the ring 18 is provided. A metal ring 20 fits around the portion 19. This ring is provided with radially extended pointed prongs 21 which extend inwardly from the upper edge of ring 20 along the reduced portion 19 of the ring 18.

In the modification shown in Figs. 6 and 7, a nut 23 is provided which has a smooth surface opening 24 at its upper end. The upper end of this nut is made thin, as indicated at 25. This portion is made slotted so that the portions between the slots can be bent inwardly.

An annular shoulder 26 is provided at the lower end of an opening in this nut and an annular shoulder 27 of larger diameter than the shoulder 26 is located nearer the edge 25 of this nut. A rubber ring or short tube 28 is located in the opening 24. A metal ring 29, similar to the ring 20, is provided with prongs 30 at its upper end. These prongs extend inwardly.

Figure 8:
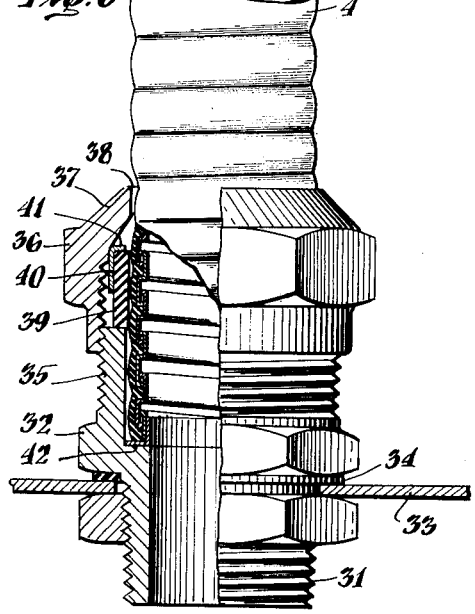
Fig. 8 is a longitudinal section through another modification.
Figure 9:
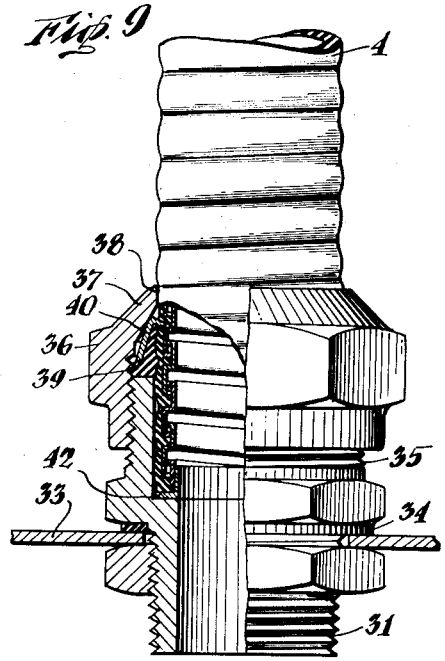
Fig. 9 is a section like Fig. 8 with parts in other positions.

In the modification shown in Figs. 8 and 9 the threaded extension 31 of the nut 32 is passed through an opening in plate 33 with a gasket 34 in place on the upper edge of this plate. The upper end of this nut 32 is threaded as shown at 35. A holder 36 is screwed on the threaded portion. Holder 36 is provided with an inwardly extending bevel portion 37 leaving an opening 38 large enough for the rubber-covered hose 4 to enter.

A cylindrically-shaped gasket 39 of rubber or rubber-like material is located on the upper edge of the threaded portion 35 of nut 32. A slitted metal ring 40 having prongs 41 at its upper edge is located on the gasket 39. In this modification, when the hose 4 is inserted so that its end rests upon the shoulder 42 and the holder 36 is screwed down the sloping surface of the bevel portion 37 thereof presses the prongs 41 inwardly which penetrate the rubber on hose 4 and securely holds the hose in place.

In using the embodiment of the invention shown in Figs. 1, 2 and 3, the gasket 6 is put in place with the ring 7 on it. The holder 9 is put on the hose 4 and this hose is inserted in the nut 1 with its end resting upon the seat 3. The holder 9 is then screwed down so that its bevelled portion 12 forces the prongs 8 inwardly as shown in Fig. 2, thus securing the hose 4 in place with the gasket 6 preventing any leakage.

In the modification shown in Figs. 4 and 5, the operation is similar to that described in the first embodiment of the invention. When the holder 9' is screwed down, it causes the prongs 21 to bite into the hose 4 sufficiently to keep it in place, while the gasket or ring 18 prevents leakage from taking place.

In the modification shown in Figs. 6 and 7, after the end of the hose 4 has been inserted in the nut 23, the slotted thin edge 25 of the nut 23 is bent into the position 25' shown in Fig. 7, thereby causing the radial portions 30 of the ring 29 to assume the positions 30' shown in Fig. 7, thus keeping the hose 4 in place and hermetically sealing the joint against leakage.

In the modification shown in Figs. 8 and 9, after the end of the hose has been inserted in the nut 32 the holder 36 is screwed down whereupon the sloping surfaces of the bevelled portion 37 force the sharp ends of the prongs 41 through the rubber on the hose 4 and into contact with the metal.

Figure 11:
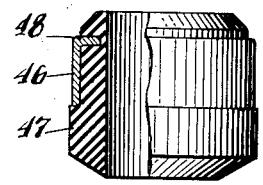
Fig. 11 is a similar view showing another modification.

Modification of the rings or gaskets such as the gaskets 6, 18 and 28 are shown in Figs. 10 and 11. The gasket 43 shown in Fig. 10 is molded with the ring 44 in place. The pointed ends of the prongs 45 are almost flush with the inner surface of the ring or gasket 43 so that when the parts are assembled as described above and the nuts are screwed onto the couplings these prongs 45 penetrate the rubber on the hose and make electrical contact with the flexible metal hose.

The gasket 46 shown in Fig. 11 is made of rubber with a shoulder portion 47 and a circular groove 48 near its upper end. After this gasket is formed a metal ring with inwardly extending prongs at its upper end is slipped on over the upper end to rest upon the shoulder 47 with its inwardly extending prongs projecting into the groove so that when the hose is attached to a nipple or the like these prongs make electrical contact with the metallic hose as described above.

In each one of the embodiments of the invention the metal prongs or claws which pass through the rubber covering 4' of the hose 4 not only aids in holding the coupling rigidly to the hose, thus preventing creep or flow or loosening by vibration, but also makes metal-to-metal contact, thus providing electrical conduction from the metal hose 4 to the couplings. Also, any burrs that may be left at the end of a hose that is cut off and connected as described are entirely enclosed and prevented from injuring anything; water-tight and air-tight seals are provided by the rubber gaskets when the parts are installed; and no shoulder or projection remains which might interfere with pulling wires through the hose and coupling.

What is claimed is:

1. A coupling comprising a tube and a nut in threaded engagement, a metal ring in said nut having an inwardly extending pointed portion located so as to engage said tube radially and a ring of resilient material supporting said metal ring.

2. The coupling of claim 1 in which said metal ring is a split ring.

3. The coupling of claim 1 in which said metal ring extends along the outer side of said ring of resilient material.

4. A coupling comprising a nut having an internal thread and an annular shoulder on the inside thereof, an externally threaded tubular holder adapted to screw into said nut, said holder having a bevelled surface along its inner end and a metal member in said nut adapted to be pressed inwardly by said bevelled surface.

5. A coupling comprising a nut having an internal thread, an annular shoulder, a packing ring on said shoulder having inwardly directed teeth and an externally threaded tubular holder adapted to screw into said nut, said holder having a bevelled surface along its inner end.

6. A coupling comprising a nut having an internal thread, an annular shoulder, a resilient ring on said shoulder, a metal ring on outer surface portion of said resilient ring and having radially extending prongs, and an externally threaded tubular holder adapted to screw into said nut, said holder having a bevelled surface along its inner end.

7. A coupling comprising a tube and a nut in threaded engagement, a metal ring in said nut having an inwardly extending portion, a ring of resilient material supporting said metal ring, said inwardly extending portion comprising a plurality of prongs extending radially and inwardly along the end of said ring of resilient material.

8. A coupling comprising a tube and a nut in threaded engagement, a metal ring in said nut having inwardly extending portion, a ring of resilient material supporting said metal ring, said inwardly extending portion comprising a plurality of radially extending prongs, said ring and prongs being embedded in said resilient material.

9. A coupling comprising a tube and a nut in threaded engagement, a metal ring in said nut having an inwardly extending portion, a ring of resilient material supporting said metal ring, said inwardly extending portion comprising a plurality of radially extending prongs, said ring of resilient material having a shoulder thereon and an annular groove for said prongs.

WALTER E. PHILLIPS.

REFERENCES CITED

The following references are of record in the file of this patent:

UNITED STATES PATENTS

| Number | Name | Date |
|---|---|---|
| 616,808 | Ricketts | Dec. 27, 1898 |
| 1,440,207 | Burns | Dec. 26, 1922 |
| 1,565,643 | Hays | Dec. 15, 1925 |
| 1,725,853 | Crotty | Aug. 27, 1929 |
| 1,919,860 | Reutter et al. | July 25, 1933 |
| 2,301,280 | Howe | Nov. 10, 1942 |
| 2,405,822 | Franck | Aug. 13, 1946 |